United States Patent [19]

Cummings et al.

[11] Patent Number: 4,982,124
[45] Date of Patent: Jan. 1, 1991

[54] VIBRATION-TOLERANT WIRE TERMINATION

[75] Inventors: David H. Cummings, Waukesha; David A. Selby, Delafield, both of Wis.

[73] Assignee: Milwaukee Electric Tool Corporation, Brookfield, Wis.

[21] Appl. No.: 467,665

[22] Filed: Jan. 19, 1990

[51] Int. Cl.⁵ .............................................. H02K 3/50
[52] U.S. Cl. ...................................... 310/71; 310/43; 439/452
[58] Field of Search .................... 310/71, 208, 254, 43; 439/452, 456, 457, 459

[56] References Cited

U.S. PATENT DOCUMENTS 3,974,407  8/1976  Dochterman ..................... 310/71
4,361,773  11/1982  Mokrzycki ........................ 310/71

FOREIGN PATENT DOCUMENTS 228937  9/1988  Japan ............................ 310/71

Primary Examiner—Peter S. Wong
Assistant Examiner—D. L. Rebsch
Attorney, Agent, or Firm—Bayard H. Michael

[57] ABSTRACT

The stator is made of laminated stampings having congruent outlines defining the central opening for a rotor and also defining pole pieces which include horn-like portions spaced from the main body of the stamping to define winding slots for the coil. Each end of the assembly has a terminal board which has an outline generally congruent with the laminations. Two terminals are mounted in the supports carried by the terminal board adjacent each pole piece. The ends of the wire of each coil are led across the adjacent terminal, then back between the terminal and a tang formed from the terminal. Then the tang is pressed against the terminal and wire, and fused to complete the connection.

3 Claims, 2 Drawing Sheets

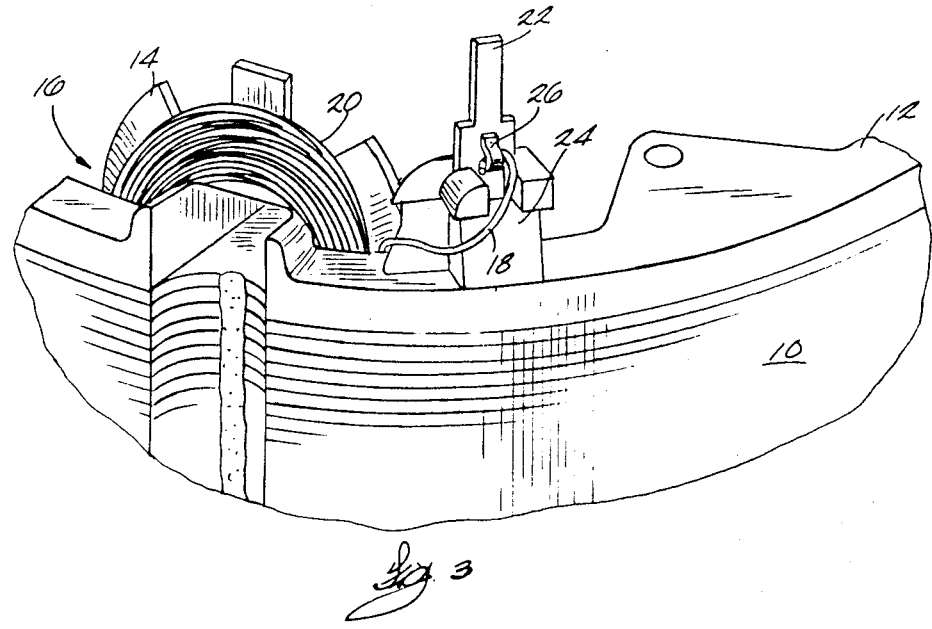
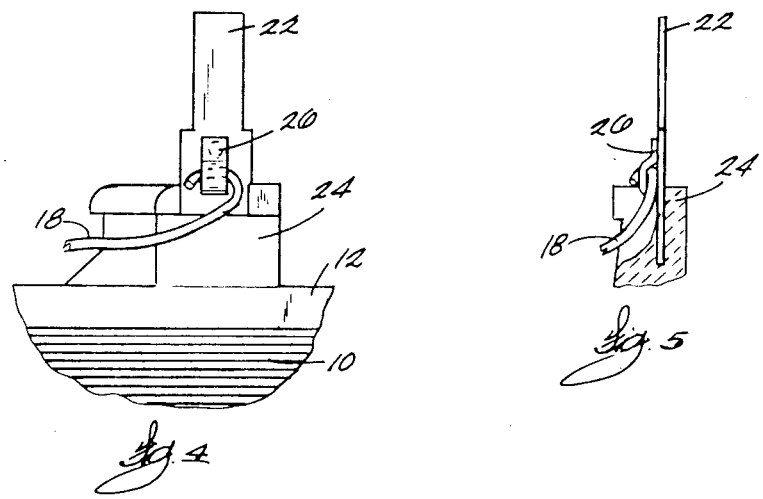

4,982,124

VIBRATION-TOLERANT WIRE TERMINATION

FIELD OF THE INVENTION

This invention relates to a connection of the field coil wire to a terminal supported or fixed on the terminal block of an electric motor.

BACKGROUND OF THE INVENTION

The field coil wires in the present type of electric motor are wound on the pole pieces and the ends are connected to terminals supported by the terminal block. The coil is wound and the connection of the wire to the terminals is handled by robotic machines. The final connection of the wire to the terminal is secured by crimping the terminal tang into the wire, and the connection is then fused by known technology to securely fix the wire to the terminal.

Most motors are not subjected to significant vibration but when the motor is used in certain kinds of hand tools the motor is subjected to substantial vibration or shock caused by the nature of the tool, such as hammer-drills, impact wrenches and rotary hammers. This impact or vibration causes relative movement between the terminal and the coil and this results in small but damaging flexure of the wire, leading to breakage of the wire which, of course, shuts down the motor and the tool. The breakage occurs approximately where the wire enters the tang. The wire enters the space between the tang and the terminal at essentially 90°. The fusing process heats the copper wire enough so that it hardens and the pressure of the fusing tool against the tang coupled with the heat causes the wire to melt down a little bit at the point where the wire enters the space between the tang and the terminal. The combination of necking down and heating and hardening the wire, coupled with the vibration, sets up a combination of factors leading to breakage of the wire.

SUMMARY OF THE INVENTION

This invention provides a motor having a field coil wound on a pole piece and having each end of the coil connected to a terminal carried by a terminal board fixed on the stator laminations. The wire from said coil end crosses the terminal to enter the space between the tang and the terminal on the side of the terminal remote from the coil and passes between the tang and the terminal. It is believed this results in the vibration of the terminal setting up more of a twisting action on the wire rather than a bending action as characteristic of the prior art.

This construction results in a great increase in life of the connection, even though the wire in the preferred construction is still subjected to heating and fusing, as characteristic of the prior art. The amplitude of vibration is obviously unaffected by this change. It is thought that leading the wire to the terminal in this manner reduces the effective amplitude of movement to which the wire is subjected. This movement is imposed over more length of the wire as compared to the concentrated location in the prior art construction.

This arrangement has resulted in a very substantial increase in product life and appears to solve a long recognized industry problem.

BRIEF DESCRIPTION OF THE DRAWINGS

FIG. 3 is a fragmentary enlarged detail of a portion of the stator and the associate terminal board and terminal with the coil wire wound in the winding slots.

FIG. 4 is a further enlarged detail showing the manner in which the coil wire is lead to and secured to the terminal.

FIG. 5 is a detailed side view of FIG. 4 showing the manner of terminating the coil wire.

DETAILED DESCRIPTION OF THE DRAWINGS

Figure 1:
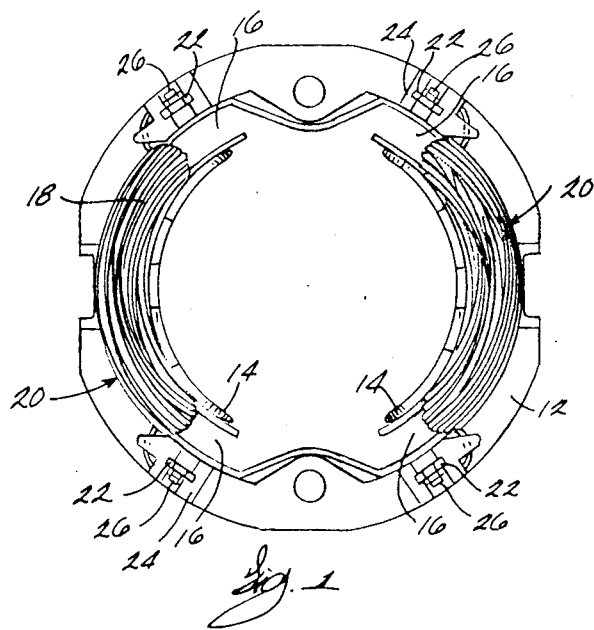
FIG. 1 is an end view of the stator assembly showing the terminal end of the assembly.
Figure 2:
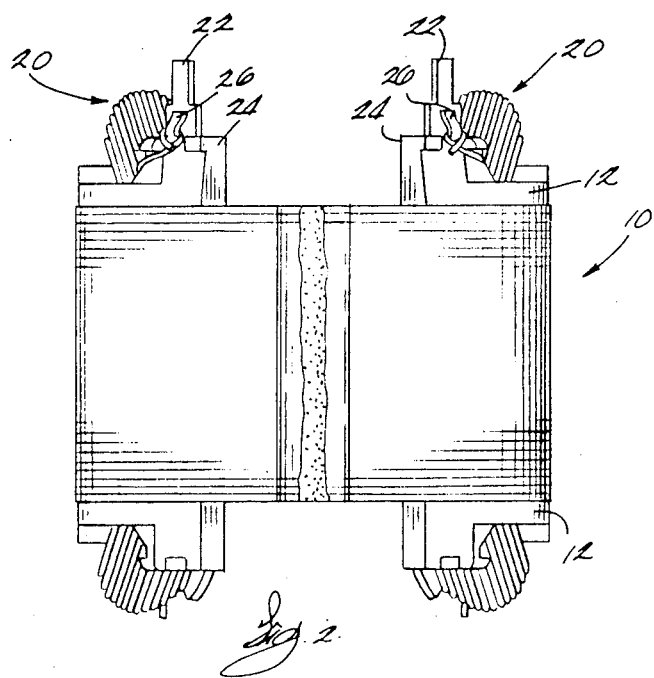
FIG. 2 is a view of FIG. 1 from either the left or right side of FIG. 1.

The stator 10 is made up of a stack of stampings having congruent outlines. Each end of the laminated stack of stampings is provided with a terminal board 12, the outlines of which are congruent with those of the laminations and include a portion aligned with the pole pieces in the stator and including wings 14 which match up with the pole pieces and define winding slots 16 in which wire 18 is wound to make the coil 20 for each of the pole pieces. The ends of the wire making up each coil 20 are secured to terminals 22. In the illustrated embodiment, all terminals are located at one end of the stator assembly, being mounted in slots provided in the terminal supports 24 molded integrally with the terminal boards 12. Terminals may, however, be situated at both ends of the stator. Each terminal has a tang 26 formed from the terminal metal. Each tang is bent back on the terminal as indicated to initially provide a space between the tang 26 and the terminal.

The ends of the wire forming each of the coils are led out of the winding slot 16 on both sides of the pole piece. The wire then crosses the terminal support 24 and terminal 22 to enter the space between the tang and the terminal from the side of the terminal opposite the side closest to the point where the wire exits the winding slot 16. Now the wire is cut off and the tang is pressed down against the terminal and fused to the terminal to firmly clamp the wire between the tang and terminal. This type of connection, including fusing, is customary in the art, but the manner of leading the wire end across the terminal and then back between the tang and the terminal is new.

This arrangement is such that when the motor is subjected to severe vibration the wire end does not appear to be flexed as in past construction, but if any movement takes place it seems to be more of a twisting action rather than a flexing or bending action and this has resulted in a very considerable increase in the life of the wire connection to the terminal. Prior to this construction it was not at all unusual to have the wire break at the point of connection to the terminal. With this construction it is most unusual to have the wire break. This results in a considerable increase in the life of the motor and the tool.

I claim:

1. An electric motor field coil construction comprising, a stator assembly made of a stack of laminated stampings having congruent outlines and defining a central opening to receive a rotor and also having pole pieces defining winding slots, a terminal board mounted on each end of said stator and including wings generally congruent with said pole pieces and extensions congruent with said central opening, wire wound in adjacent slots and over said extensions at each end of said stator assembly to form a field coil, a terminal support adjacent each said slot, a terminal mounted in each said support, the wire of each coil having each end thereof exiting the winding slot adjacent a terminal, each terminal including a tang on the side of the terminal facing outwardly from the center of the stator assembly, each wire end leading from its coil across the outside of the adjacent terminal and then back across the terminal between the terminal and the tang, said tang being bent onto said wire where it crosses said terminal between said tang and said terminal.

2. An electric motor field coil construction comprising, a stator assembly made of a stack of laminated stampings having congruent outlines and defining a central opening to receive a rotor and also having pole pieces defining winding slots, a terminal board mounted on each end of said stator and including wings generally congruent with said pole pieces and extensions congruent with said central opening, wire wound in adjacent slots and over said extensions at each end of said stator assembly to form a field coil, a terminal support adjacent each said slot, a terminal mounted in each said support, the wire of each coil having each end thereof exiting the winding slot adjacent a terminal, each terminal including a tang on the side of the terminal facing outwardly from the center of the stator assembly, each wire end leading from its coil across the outside of the adjacent terminal and then back between said tang and said terminal, said tang being bent onto said wire where it crosses said terminal between said tang and said terminal.

3. An electric motor field coil construction comprising, a stator assembly made of a stack of laminated stampings having congruent outlines and defining a central opening to receive a rotor and also having pole pieces defining winding slots, a terminal board mounted on each end of said stator and including wings generally congruent with said pole pieces and extensions congruent with said central opening, wire wound in adjacent slots and over said extensions at each end of said stator assembly to form a field coil, a terminal support adjacent each said slot, a terminal mounted in each said support, the wire of each coil having each end thereof exiting the winding slot adjacent a terminal, each terminal including a tang on the side of the terminal facing outwardly from the center of the stator assembly, each wire end leading from its coil across the outside of the adjacent terminal to the far side of said tang and then back between said tang and said terminal, said tang being bent onto said wire and fused to said terminal.

* * * * *